July 31, 1962  R. B. FREDERICK  3,047,037
TRACTION DEVICE FOR VEHICLE TIRES
Filed Aug. 22, 1961
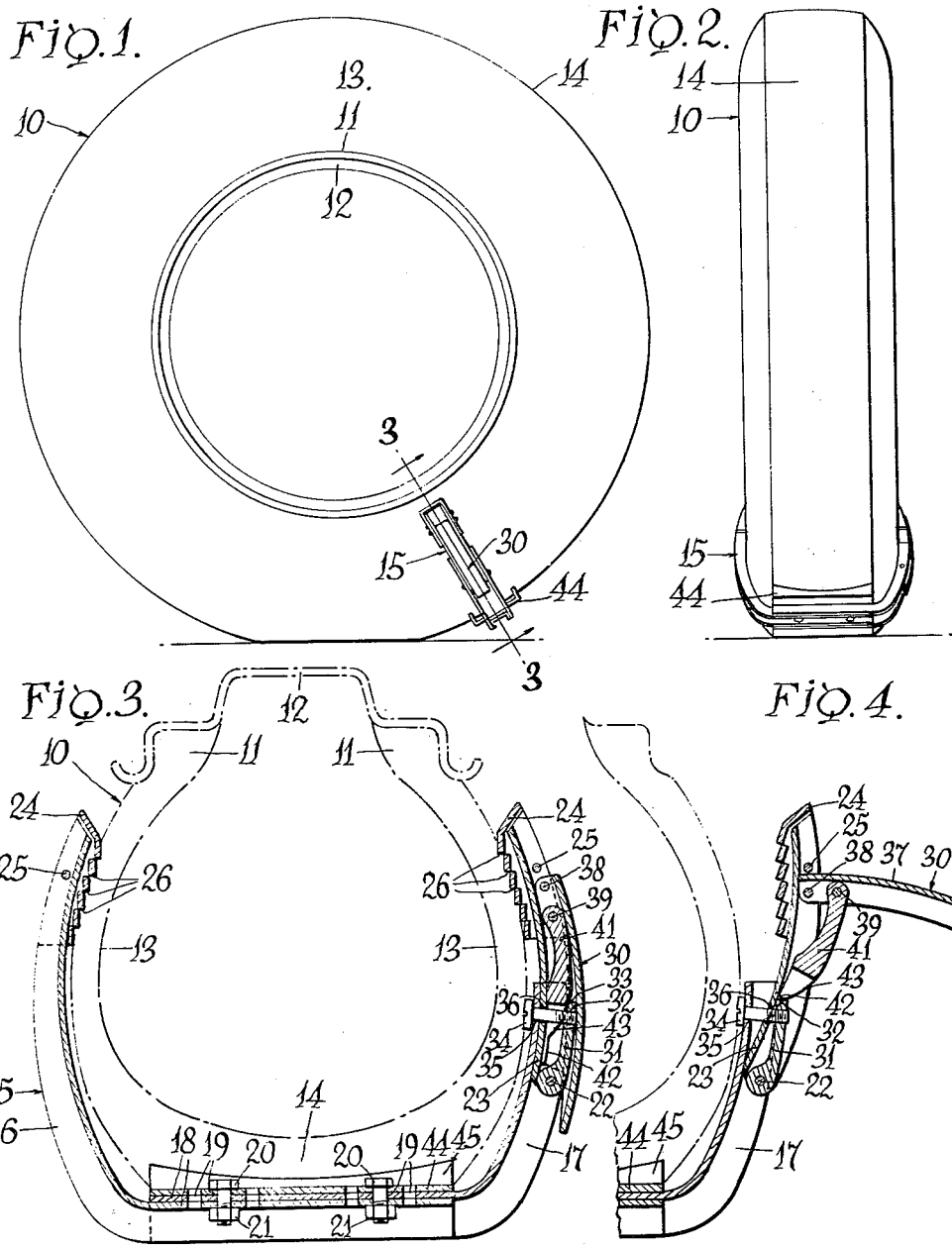
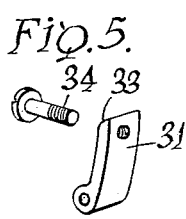
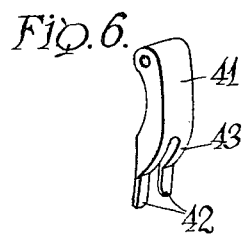
INVENTOR.
Ralph B. Frederick,
BY
Raymon E. Rousseau
ATTORNEY United States Patent Office 3,047,037
Patented July 31, 1962

3,047,037
TRACTION DEVICE FOR VEHICLE TIRES
Ralph B. Frederick, 734 Taunton Place, Buffalo, N.Y.
Filed Aug. 22, 1961, Ser. No. 133,151
5 Claims. (Cl. 152—228)

My invention relates to improvements in traction devices for vehicle tires.

In modern automotive vehicles the fenders extend well beyond and encase a large proportion of the associated tire and it is an extremely difcult operation to apply present traction devices, especially those that fully embrace the small acessible portion of the tires of such vehicles.

A number of patents have been issued for traction devices which do not fully embrace the tire to which they are applied. However, most of these prior traction devices employ mechanisms which are not readily operable by light finger pressure and some require the use of tools in their installation and removal.

The main object of this invention is to provide a U-shaped traction device which can be readily positioned and secured on a tire and to increase its traction and readily removed therefrom by using light finger pressure on an operating fingerpiece.

Another object is to provide a U-shaped traction device with a pair of spaced fixed leg portions, to provide one of said leg portions with a pivoted leg portion movable between tire gripping and non-gripping positions, to provide said one fixed leg portion with a first fixed cam member, to provide said pivoted leg with a pivoted finger piece, and to provide said finger piece with a pivoted second cam member engageable with the first cam member by and during movement of the finger piece in one direction for moving the movable leg to and locking it in its tire gripping positions and upon movement in the opposite direction for positioning the second cam member to allow movement of the movable leg to its non-gripping position.

Another object is to provide the device with means for adjusting the position of the first cam member for proper cooperation with the second cam member and to compensate for wear of said cam members.

Another object is to provide both the inner end of one fixed leg and the pivoted member with a pivoted shoe having a roughened inner surface engageable with the side wall of a tire for preventing inadvertent displacement of the device from the tire.

Another object is to adjustably secure the fixed legs together to allow use of the device with several tire sizes.

Another object is to provide the device with a channel member formed and arranged thereon to engage the tire tread in a manner to resist displacement of the device thereon.

These and other objects and characterizing features of my invention will appear from a perusal of the following detailed description of a presently preferred form of my invention and from the drawing wherein like reference numerals denote like parts and wherein FIGURE 1 is an elevational view of a tire upon which a traction device constructed in accordance with the principles of the present invention has been secured.

FIGURE 2 is a side elevational view of FIGURE 1.

FIGURE 3 is an enlarged sectional view taken on the line 3—3 of FIGURE 1 showing the device in full lines engaged with and secured upon a tire shown in broken lines.

FIGURE 4 is a fragmentary sectional view similar to FIGURE 3 and showing the movable leg and associated elements positioned to allow removal of the device from the tire.

FIGURE 5 is a group perspective view of the first cam member and its adjusting screw and FIGURE 6 is perspective view of the record cam member.

Referring now to the drawing, the numeral 10 generally designates a conventional tire having bead portions 11 mounted in the rim portion 12 of a wheel and side walls 13 extending between the bead portions and a tread portion 14.

The traction device of the present invention is generally designated by the numeral 15 and includes a U-shaped frame formed with curved side leg portions 16 and 17 each adjoining a straight connecting portion 18.

In order that the device may be selectively adapted to fit several different sizes of tires each leg is formed with a connecting portion which portions overlie one another and are provided with a plurality of spaced alineable openings 19 to receive fastening means such as the bolts 20 each provided with a lock nut 21.

As shown in the drawing, the leg portions 16 and 17 and the connecting portions 18 are preferably channel shaped and as best shown in FIGURE 3 the thus shaped connecting portion 18 of the leg 16 is embraced by the connecting portion 18 of the leg 17. The leg 17 is of less extent than the leg 16 and adjacent its end carries a transverse pivot pin 22 upon which one end of an extension leg 23 is pivotally carried. The terminal end of the leg 23 lies in transversely opposite spaced relation to the terminal end of the leg 16 and these terminal ends extend inwardly beyond the greatest width of the tire so that when they are engaged with said side walls and locked in place in a manner to be described they cannot by inadvertently displaced. The terminal ends of the leg 16 and the leg 23 may be roughened or formed to prevent movement from their locked position on the tire side walls, however, they are each preferably provided with an overlying shoe 24 pivotally connected thereto by a pivot pin 25, thus allowing them the slight pivotal movement necessary to adapt the device for use with different sizes of tires. The opposed surfaces of the shoes 24, as shown in FIGURE 3, are formed with spaced effect shoulders 26 which serve to more securely grip the side walls of the tire.

A cam action mechanism for moving the leg 23 toward and locking it in a predetermined spaced relation to the leg 16 whereby the shoes 24 are positioned to securely grip the side walls of the tire, is generally indicated by the numeral 30. This mechanism includes a first cam member 31 having one end pivotally carried by the pivot pin 22, its other end portion formed with a threaded hole 32 adjacent a cam surface 33 formed at its terminal end. A headed screw 34 extends thru a hole 35 in the leg 17 and thru a slot 36 in the leg 23 and has threaded engagement with the hole 32 and it will be apparent that the leg 23 may be swung between the positions shown in FIGURES 3 and 4 and that by simply turning the screw 34, the position of the cam surface 33 may be adjusted to properly position it with respect to a cam surface of a second cam to be later described and to compensate for any wear on said cam surfaces.

A channel shaped curved finger piece 37, as best shown in FIGURES 3 and 4, is pivotally connected to the leg 23 by a transverse pivot pin 38 and adjacent said pin is provided with a transverse pivot pin 39 upon which one end of a second cam lever member 41 is pivotally connected. The opposite end portion of the lever means 41 is reduced and bifurcated as at 42 to receive the screw 34 and to allow its movement between the positions shown in FIGURES 3 and 4, and is formed with a second cam surface 43 which when the fingerpiece 37, as viewed in FIGURE 4, is moved downwardly rides over the first cam surface 33 and thereby forces the leg 23 toward the leg 16. Upon completion of the downward movement of the fingerpiece 37 it embraces and encloses the first and second cam means and at this time due to the form and location of said cam surfaces and the location of the pivot pins 22, 38 and 39 it will be seen that the leg 23 is rigidly locked against opening movement until the fingerpiece is again swung upwardly, whereupon the cam surface 43 is caused to ride upwardly over the cam surface 33 to a position allowing the fingerpiece 37, the leg 23 and the lever 41 to be readily swung to the position shown in FIGURE 4.

In order to prevent undue swinging movement of the device 15 about the terminal ends of the legs 16 and 17 when in use on a tire and undue peripheral movement of the connecting portions 18 on the tread portion 14 of the tire, a channel member 44 has its web portion formed with a set of holes alineable with the holes 19 in the portions 18 so that it can be centered and selectively secured thereon by the bolt and nut fasteners 20—21 for use with different sizes of tires and has its side flanges 45 spaced and formed to the general transverse curvature of the tread 14 to extend transversely across and engage said tread and thereby prevent such undue movements.

It will be noted that when the device 15 is in use on a tire the shoes 24 are spaced less than the width of the tire to prevent it from being inadvertently forced off the tire and that the spacing of the shoes 24 is greater than the spacing of the sides of the rim 14 to allow said legs free inward movement thereacross should the tire be heavily loaded or underinflated.

When the parts of the device are positioned as in FIGURE 4 it will be readily understood that said device can be readily applied to and removed from a tire, and that since the spacing of the pivot pin 39 from the pivot pin 38 is relatively small with respect to the overall length of the fingerpiece, little finger pressure thereagainst is required to lock and unlock the device.

It should be understood that the herein disclosed form of my invention is intended to exemplify its principles and that various modifications and rearrangements of its component parts may be made within the scope of the appended claims wherein I claim:

1. An auxiliary traction device for vehicle tires comprising a tread engaging base member and a pair of sidewall engaging leg members extending rigidly from opposite sides thereof, one of said leg members extending to approximately the wide portion of one of the tire sidewalls and having a recess adjacent to the end thereof opening generally away from said base member, a movable leg member pivoted at one end to said one leg member in said recess and extending generally away from said base member, and means for locking said movable leg member in sidewall engaging position comprising a locking lever pivoted at one end to an outer portion of said movable leg member and movable pivotally toward and away from said one leg member, an elongate wedge member pivoted at one end to said locking lever at a point thereon spaced from the pivotal mounting thereof, said wedge member having a wedge formation at its other end directed generally toward said recess, whereby pivotal movement of said locking lever toward said one leg member moves said wedge member into said recess adjacent to the outer side of said movable leg member to force the latter against said sidewall.

2. An auxiliary traction device for vehicle tires comprising a tread engaging base member and a pair of sidewall engaging leg members extending rigidly from opposite sides thereof, one of said leg members extending to approximately the wide portion of one of the tire sidewalls and having a recess adjacent to the end thereof opening generally away from said base member, a movable leg member pivoted at one end to said one leg member in said recess and extending generally away from said base member, and means for locking said movable leg member in sidewall engaging position comprising a locking lever pivoted at one end to an outer portion of said movable leg member and movable pivotally toward and away from said one leg member, an elongate wedge member pivoted at one end to said locking lever at a point thereon spaced from the pivotal mounting thereof, said wedge member having a wedge formation at its other end directed generally toward said recess, whereby pivotal movement of said locking lever toward said one leg member moves said wedge member into said recess between the outer side of said movable leg member and the outer side of said recess to force the movable leg member against said sidewall.

3. An auxiliary traction device for vehicles tire comprising a tread engaging base member and a pair of sidewall engaging leg members extending rigidly from opposite sides thereof, one of said leg members extending to approximately the wide portion of one of the tire sidewalls and having a recess adjacent to the end thereof opening generally away from said base member, a movable leg member pivoted at one end to said one leg member in said recess and extending generally away from said base member, and means for locking said movable leg member in sidewall engaging position comprising a locking lever pivoted at one end to an outer portion of said movable leg member and movable pivotally toward and away from said one leg member, an elongate wedge member pivoted at one end to said locking lever at a point thereon spaced from the pivotal mounting thereof, said wedge member having a wedge formation at its other end directed generally toward said recess, whereby pivotal movement of said locking lever toward said one leg member moves said wedge member into said recess between the outer side of said movable leg member and the outer side of said recess to force the movable leg member against said sidewall, said locking lever and said wedge member comprising a toggle joint and movable into substantially a straight line position upon locking movement of said lever to secure the wedge member against inadvertent dislodgement.

4. An auxiliary traction device for vehicle tires comprising a tread engaging base member and a pair of sidewall engaging leg members extending rigidly from opposite sides thereof, one of said leg members extending to approximately the wide portion of one of the tire sidewalls and having a recess adjacent to the end thereof opening generally away from said base member, a movable leg said recess and extending generally away from said base member pivoted at one end to said one leg member in member, and means for locking said movable leg member in sidewall engaging position comprising a locking lever pivoted at one end to an outer portion of said movable leg member and movable pivotally toward and away from said one leg member, an elongate wedge member pivoted at one end to said locking lever at a point thereon spaced from the pivotal mounting thereof, and said wedge member having a wedge formation at its other end directed generally toward said recess, whereby pivotal movement of said locking lever toward said one leg member moves said wedge member into said recess adjacent to the outer side of said movable leg member to force the latter against said sidewall, and means for adjusting the effective width of said recess in a direction normal to the tire surface to compensate for dimensional variations and insure secure wedging locking action.

5. An auxiliary traction device for vehicle tires comprising a tread engaging base member and a pair of sidewall engaging leg members extending rigidly from opposite sides thereof, one of said leg members extending to approximately the wide portion of one of the tire sidewalls and having a recess adjacent to the end thereof opening generally away from said base member, a movable leg member pivoted at one end to said one leg member in said recess and extending generally away from said base member, and means for locking said movable leg member in sidewall engaging position comprising a locking lever pivoted at one end to an outer portion of said movable leg member and movable pivotally toward and away from said one leg member, an elongate wedge member pivoted at one end to said locking lever at a point thereon spaced from the pivotal mounting thereof, said wedge member having a wedge formation at its other end directed generally toward said recess, whereby pivotal movement of said locking lever toward said one leg member moves said wedge member into said recess adjacent to the outer side of said movable leg member to force the latter against said sidewall, said locking lever and said wedge member forming a toggle joint adapted to lie substantially along said one leg member and said movable leg member when the parts are in locked position.

References Cited in the file of this patent

UNITED STATES PATENTS

| | | |
|---|---|---|
| 1,775,211 | Pearson | Sept. 9, 1930 |
| 2,457,208 | Carpenter | Dec. 28, 1948 |
| 2,474,262 | Linderme | June 28, 1949 |
| 2,646,834 | Rusch | July 28, 1953 |
| 2,652,092 | Lantz | Sept. 15, 1953 |
| 2,976,903 | Verdesca | Mar. 28, 1961 |